US012695364B2

(12) United States Patent
Lim

(10) Patent No.: US 12,695,364 B2
(45) Date of Patent: Jul. 28, 2026

(54) SLIP RING DEVICE FOR MOTOR

(71) Applicant: HYUNDAI MOBIS CO., LTD., Seoul (KR)

(72) Inventor: Jung Yoon Lim, Uiwang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 85 days.

(21) Appl. No.: 18/584,328

(22) Filed: Feb. 22, 2024

(65) Prior Publication Data

US 2024/0291356 A1     Aug. 29, 2024

(30)     Foreign Application Priority Data

Feb. 23, 2023   (KR) ......................... 10-2023-0024197
Apr. 14, 2023   (KR) ......................... 10-2023-0049630

(51) Int. Cl.
  *H01R 39/08*     (2006.01)
  *H01R 39/34*     (2006.01)
  *H02K 13/00*     (2006.01)
(52) U.S. Cl.
  CPC ........... *H02K 13/003* (2013.01); *H01R 39/08* (2013.01); *H01R 39/34* (2013.01)
(58) Field of Classification Search
  CPC ...... H02K 13/003; H02K 13/02; H02K 13/00; H01R 39/08; H01R 39/085; H01R 39/10; H01R 39/12
  See application file for complete search history.

(56)     References Cited

U.S. PATENT DOCUMENTS

| | | | | |
|---|---|---|---|---|
| 2014/0361658 A1 * | 12/2014 | Imazawa | ................ | H01R 39/16 |
| | | | | 310/232 |
| 2018/0233994 A1 * | 8/2018 | Shirai | ..................... | H01R 39/34 |
| 2020/0067247 A1 * | 2/2020 | He | .......................... | E21B 47/00 |
| 2021/0218211 A1 * | 7/2021 | Binder | ................. | H02K 13/003 |

FOREIGN PATENT DOCUMENTS

| | | | | |
|---|---|---|---|---|
| EP | 3767791 A1 * | 1/2021 | ............... | H02K 5/10 |
| JP | H05244752 A | 9/1993 | | |
| KR | 2020000011981 U | 7/2000 | | |
| KR | 1020170100699 A | 9/2017 | | |

OTHER PUBLICATIONS

EP-3767791-A1 Translation (Year: 2021).*

* cited by examiner

*Primary Examiner* — Oluseye Iwarere
*Assistant Examiner* — Nicholas Lee Setzer
(74) *Attorney, Agent, or Firm* — Dinsmore & Shohl LLP; Yongsok Choi, Esq.

(57)     ABSTRACT

A slip ring device for motor includes a shaft having a hollow therein, a slip terminal assembly including a first slip terminal portion and a second slip terminal portion and a body portion coupled to the shaft and electrically isolating the first slip terminal portion from the second slip terminal portion, and a fixing ring disposed on the slip terminal assembly and fixing the slip terminal assembly to the shaft and further includes a guide portion formed on an outer surface of the coupling portion in an insertion direction of the slip terminal assembly.

18 Claims, 10 Drawing Sheets

ASSEMBLY
DIRECTION

100 y x

SLIP RING DEVICE FOR MOTOR

CROSS-REFERENCE TO RELATED APPLICATIONS

This application is based on and claims priority under 35 USC § 119 to Korean Patent Application No. 10-2023-0024197, filed on Feb. 23, 2023, Korean Patent Application No. 10-2023-0049630, filed on Apr. 14, 2023, in the Korean Intellectual Property Office, the disclosure of which is incorporated by reference herein in its entirety.

BACKGROUND

1. Field

The present disclosure relates to a slip ring device for a motor.

2. Description of the Related Art

Motors are generally installed in various devices, such as vehicles, home appliances, and industrial equipment. A motor includes a stator and a rotor. A brush holder is installed in the motor to directly supply power to the rotor. The brush holder supplies power to the rotor via a slip ring portion. The slip ring portion is inserted into a shaft to rotate with the shaft. The brush holder is in slippery contact with the slip ring portion. A mold layer is formed in a terminal of the slip ring portion for electric insulation from the shaft.

A slip terminal serves to connect a slip ring to a field coil, and in order to protect and secure the slip terminal in a section forming the connection from centrifugal force of the motor, the slip terminal is disposed on an inner diameter of the shaft and insert injection-molded.

In order to realize the above configuration, the shaft essentially requires an opening penetrating through the inside and outside of the shaft, and in this case, oil leakage may occur in the corresponding region due to shrinkage of an injection molded product.

In addition, additional man-hours may be added to locate the slip ring portion on the inner diameter, and it may be difficult to completely fix the terminal and perform post-inspection for shape deformation during injection molding from the inner diameter.

SUMMARY

The present disclosure provides a slip ring device for a motor, capable of preventing oil leakage due to shrinkage of an injection molded product.

Additional aspects will be set forth in portion in the description which follows and, in part, will be apparent from the description, or may be learned by practice of the presented embodiments of the disclosure.

According to an aspect of the inventive concept, there is provided a slip ring device for motor including a shaft having a hollow inside, a slip terminal assembly including a first slip terminal portion and a second slip terminal portion and a body portion coupled to the shaft and electrically isolating the first slip terminal portion from the second slip terminal portion, and a fixing ring disposed on the slip terminal assembly and fixing the slip terminal assembly to the shaft.

The first slip terminal portion and the second slip terminal portion may be formed on an outer portion of the shaft.

The first slip terminal portion may include a first slip ring including a conductive material and a first slip terminal having one end connected to an inner circumferential surface of the first slip ring and another end exposed to the outside of the body portion, and the second slip terminal portion may include a second slip ring located coaxially with the first slip ring and apart from the first slip ring and a second slip terminal located to be apart from the first slip terminal and having one end connected to an inner circumferential surface of the second slip ring and another end exposed to the outside of the body portion.

The body portion of the slip terminal assembly may include a head portion allowing the first slip ring and the second slip ring to be apart from each other, a first leg portion extending from the head portion and surrounding and securing the first slip terminal, and a first leg portion extending from the head portion and surrounding and securing the second slip terminal.

The head portion may include a spacer separating the first slip ring from the second slip ring at a preset distance, and one or more irregularities may be formed in a strip shape on an outer circumferential surface of the spacer.

One end of each of the first leg portion and the second leg portion may be connected to the inside of the head portion and extend to the outside of the head portion, and another end of each of the first leg portion and the second leg portion may be bent in a direction away from an outer surface of the shaft.

The shaft may include a guide portion formed in a groove shape with a preset depth from an outer surface of the shaft in an insertion direction of the slip terminal assembly, and the first leg portion and the second leg portion of the body portion may be formed to have a thickness corresponding to the depth of the guide portion.

The shaft may include a motor connection portion connected to the motor and a coupling portion extending from the motor connection portion and into which the body portion of the slip terminal assembly is inserted, and a diameter of the motor connection portion may be greater than a diameter of the coupling portion.

The shaft may further include a guide portion formed on an outer surface of the coupling portion in an insertion direction of the slip terminal assembly.

The shaft may further include a support portion located between the motor connection portion and the coupling portion and supporting the fixing ring in an axial direction, and a diameter of the support portion may be greater than a diameter of the motor connection portion.

The hollow may include a first hollow portion formed in a position corresponding to the coupling portion, and an inner diameter of the first hollow portion may be constant in the axial direction.

The hollow may further include a second hollow portion formed in a position corresponding to the motor connection portion, and an inner diameter of the second hollow portion may be greater than the inner diameter of the first hollow portion.

The guide portion may be formed in a groove shape with a preset depth in a radial center direction from the outer surface of the coupling portion.

The fixing ring may fix the slip terminal assembly as the fixing ring is forcibly press-fitted with the slip terminal assembly located on the shaft.

The fixing ring may be located on the coupling portion of the shaft and include a first region adjacent to the motor connection portion and a second region extending from the first region, and an outer diameter of the first region may be greater than an outer diameter of the second region.

According to another aspect of the inventive concept, there is provided a slip ring device for a motor including a shaft having a hollow formed inside and a guide portion formed outside, a slip terminal assembly formed outside the shaft and including a slip terminal, and a fixing ring formed on the outside of the slip terminal assembly, wherein one side of the slip terminal is formed inside the slip terminal assembly, and another side of the slip terminal is exposed to the outside of the slip terminal assembly.

The slip terminal assembly may include a leg portion surrounding a portion of the slip terminal and a slip ring in contact with one side of the slip terminal.

The leg portion may be formed to correspond to a shape of the guide portion.

Other aspects, features and advantages in addition to those described above will become apparent from the following drawings, claims and detailed description of the present disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating a shaft of a slip ring device for a motor according to an embodiment;

DETAILED DESCRIPTION

Figure 1:
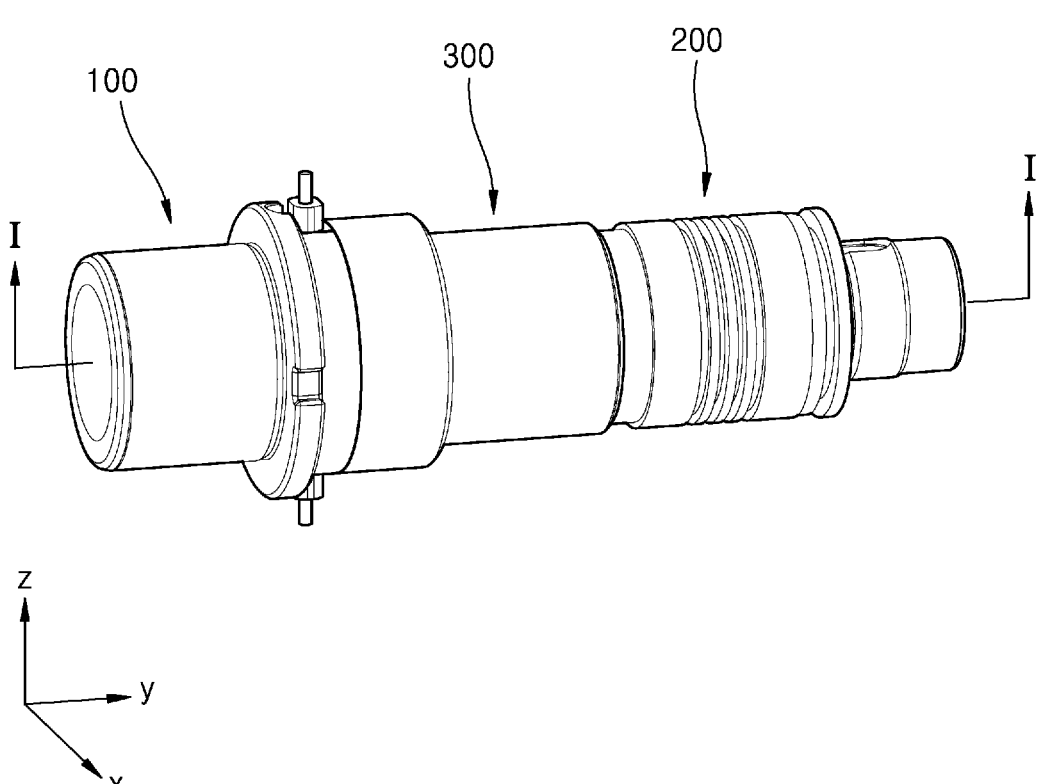
FIG. 1 is a perspective view illustrating a slip ring device for a motor according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions, such as "at least one of," when preceding a list of elements, modify the entire list of elements and do not modify the individual elements of the list.

Hereinafter, embodiments of the present disclosure are described in detail with reference to the accompanying drawings, and when described with reference to the drawings, the same or corresponding components are given the same reference numerals, and repeated descriptions thereof will be omitted.

The present embodiments may be variously modified, so specific embodiments are illustrated in the drawings and described in detail in the detailed description. Effects and characteristics of the present embodiments, and methods for achieving them are apparent with reference to the details described below in conjunction with the drawings. However, the present embodiments are not limited to the embodiments described below and may be implemented in various forms.

In the drawings, in order to clarify the present disclosure, portions not related to the description are omitted, and similar portions are given similar reference numerals throughout the specification.

In the following embodiments, terms, such as first and second are used for the purpose of distinguishing one component from another component, rather than in a limiting sense.

In the following embodiments, singular expressions include plural expressions unless the context clearly indicates otherwise.

In the following embodiments, terms such as "including" or "having" means that the features or components described in the specification are present, and do not preclude the possibility that one or more other features or components are added.

In the following embodiments, it will be understood that when a portion, such as a unit, region, component, etc. is referred to as being on or above another portion, it may be directly on the other portion or intervening elements may also be present.

In the following embodiments, terms, such as "connect" or "couple" do not necessarily mean direct and/or fixed connection or coupling of two members unless the context clearly indicates otherwise, and does not exclude that another member is present between the two members.

In the drawings, the size of components may be exaggerated or reduced for convenience of description. For example, the size and thickness of each component shown in the drawings are arbitrarily indicated for convenience of description, so the following embodiments are not limited thereto.

Terms, such as above, upper portion, bottom, lower portion, etc. used in this specification are only used to easily describe the correlation between each component shown in the drawings, and do not limit the direction in which each component is arranged.

Figure 2:
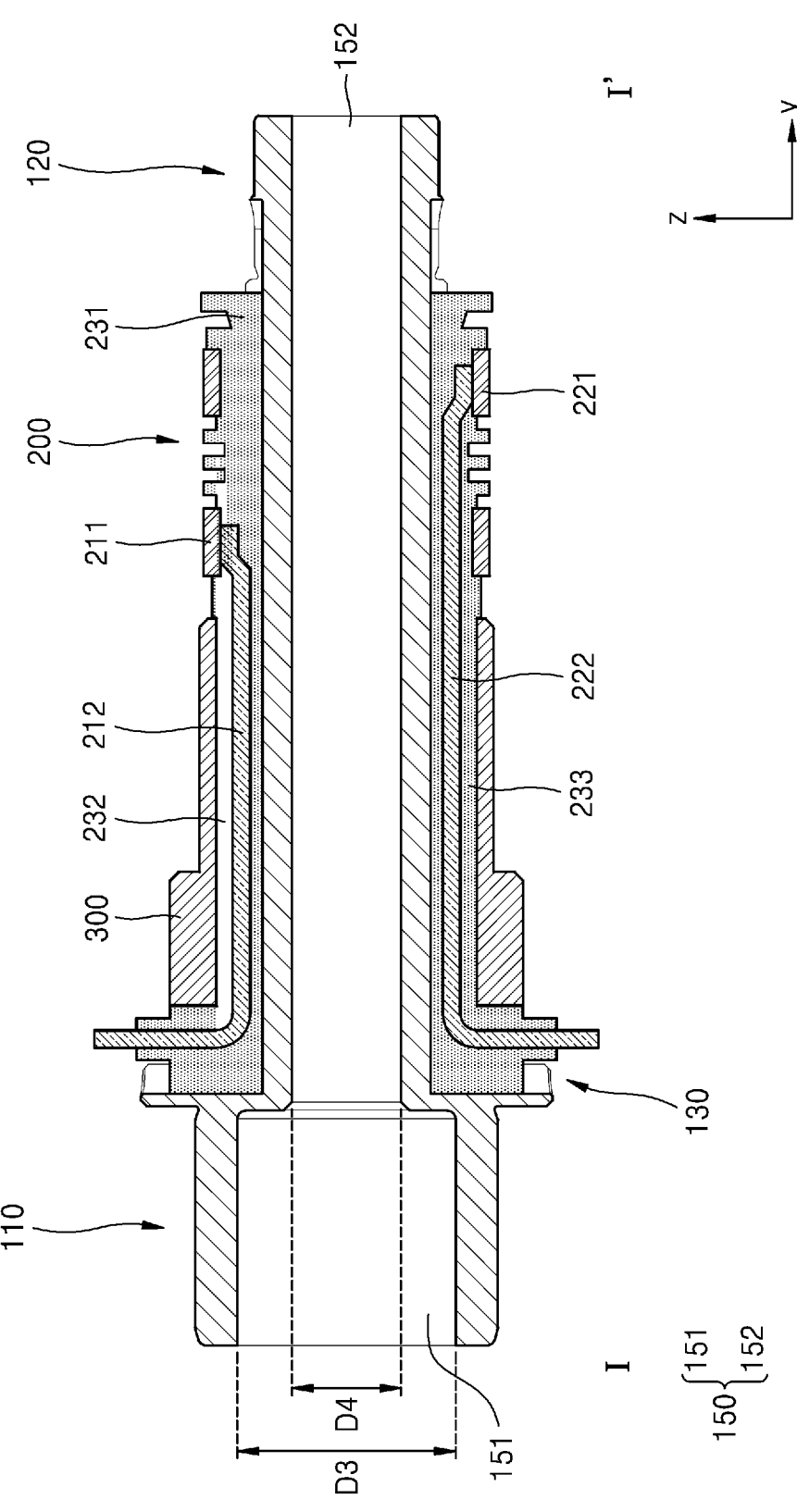
FIG. 2 is a cross-sectional view of the slip ring device for a motor of FIG. 1, taken along line I-I'.
Figure 3:
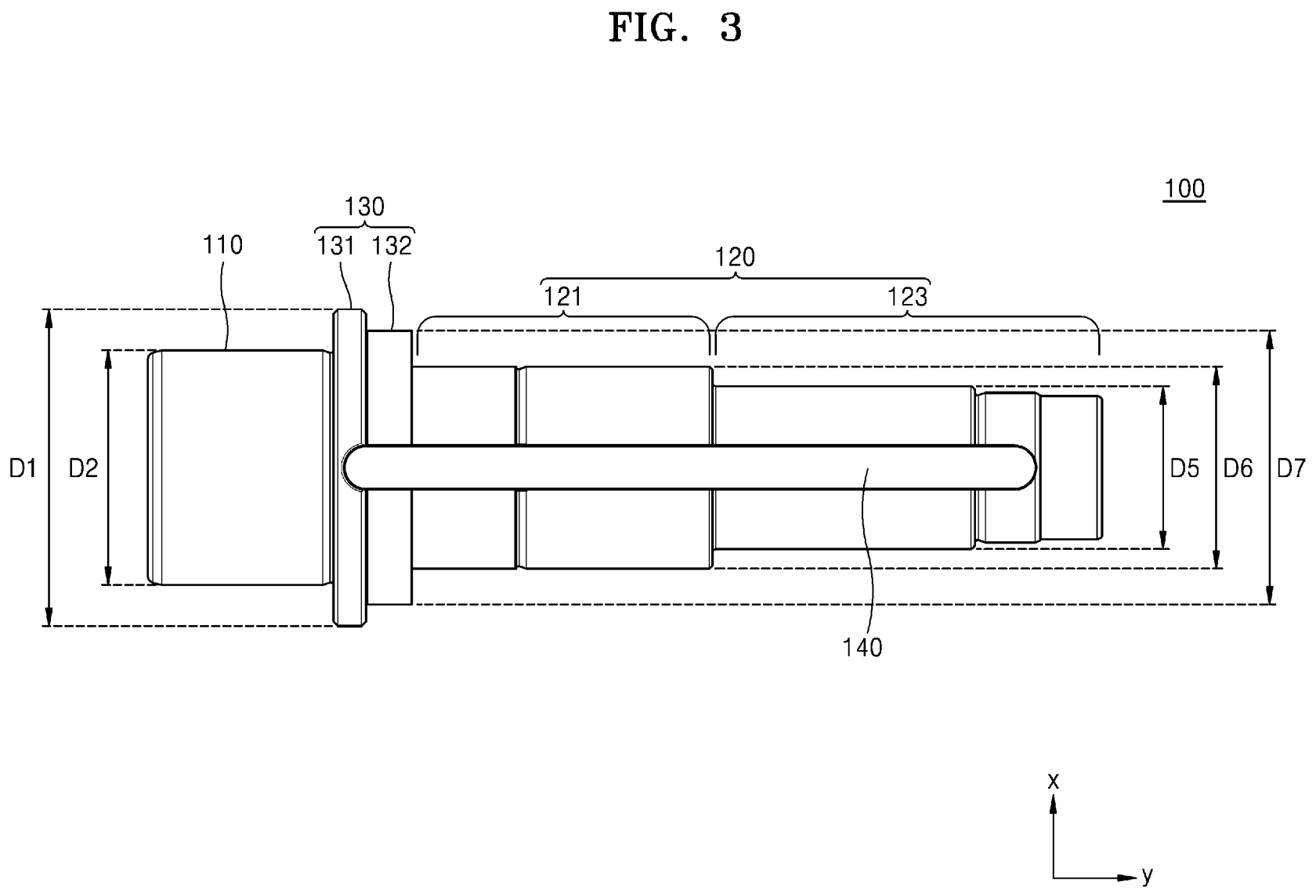
Figure 4:
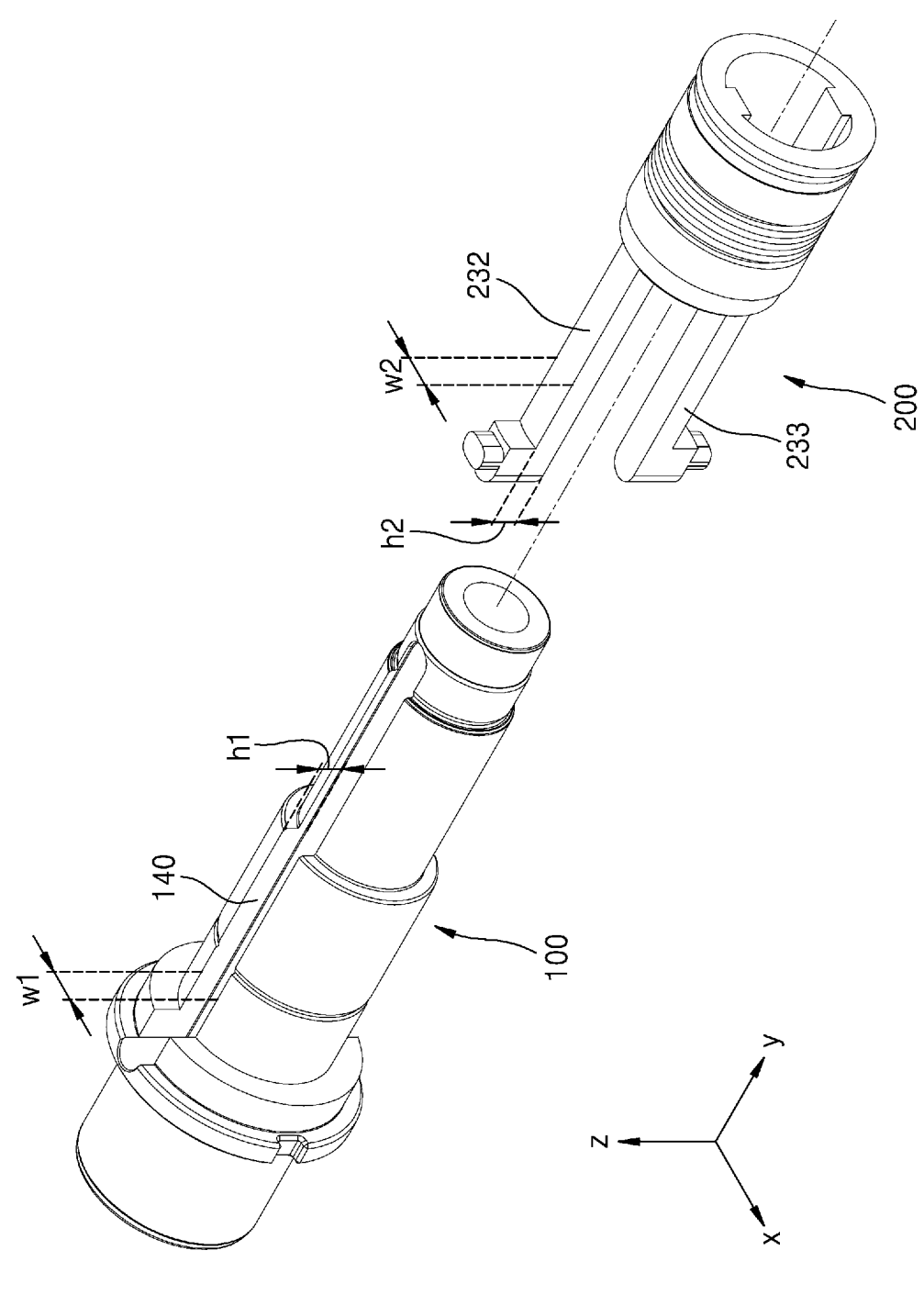
FIG. 4 is an exploded perspective view illustrating a shaft and a slip terminal assembly of a slip ring device for a motor according to an embodiment.
Figure 5A:
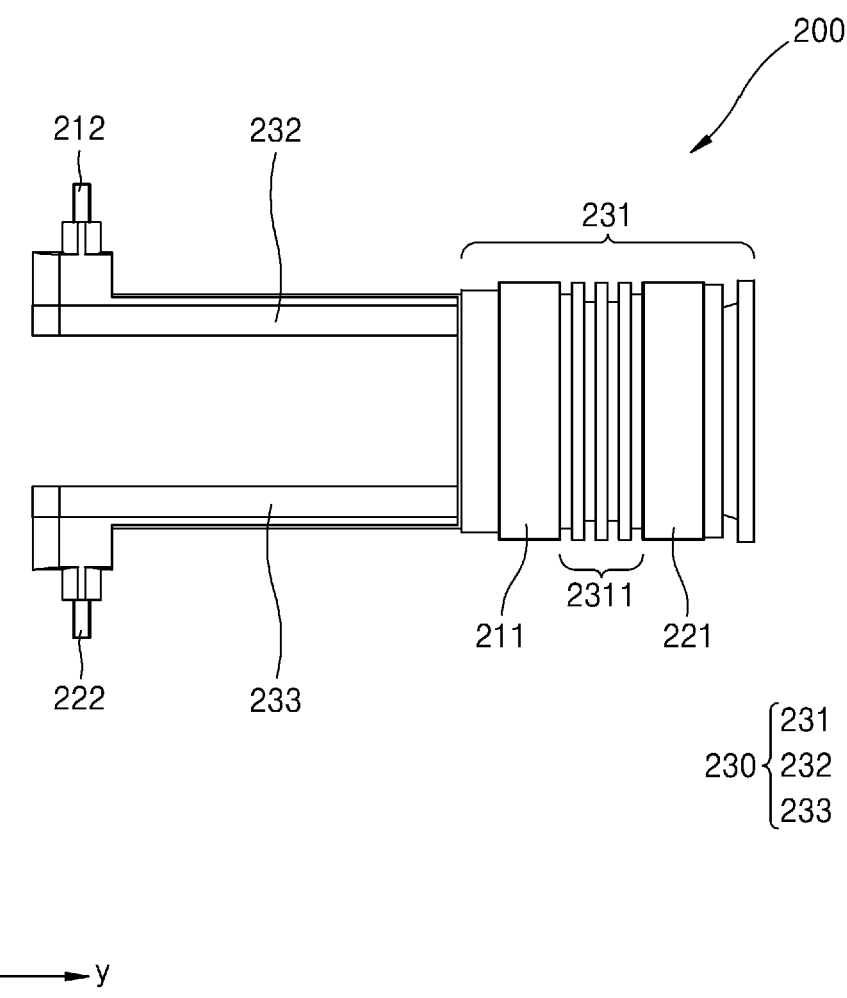
FIG. 5A is a diagram illustrating a slip terminal assembly of a slip ring device for a motor according to an embodiment.
Figure 5B:
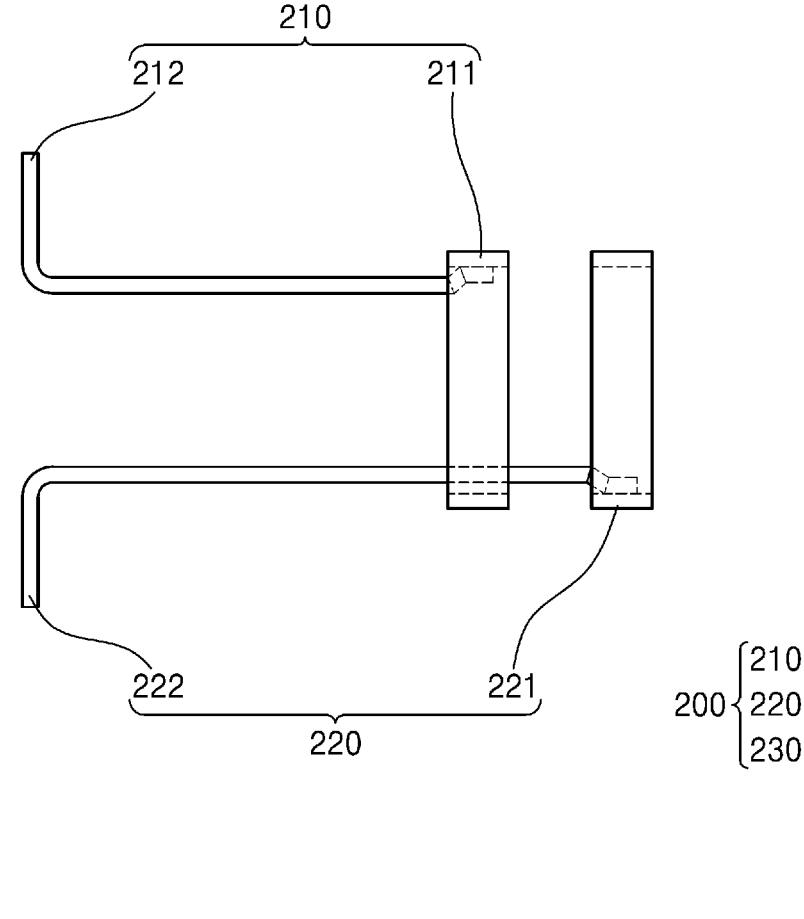
FIG. 5B is a diagram illustrating a first slip terminal portion and a second slip terminal portion of a slip ring device for a motor according to an embodiment.
Figure 6:
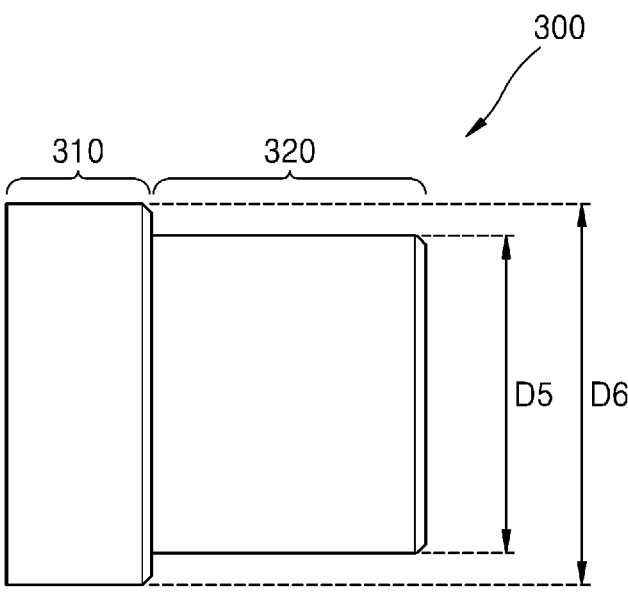
FIG. 6 is a diagram illustrating a fixing ring of a slip ring device for a motor according to an embodiment.

FIG. 1 is a perspective view illustrating a slip ring device 10 for a motor according to an embodiment, and FIG. 2 is a cross-sectional view of the slip ring device 10 for a motor of FIG. 1, taken along line I-I'. FIG. 3 is a diagram illustrating a shaft 100 of the slip ring device 10 for a motor according to an embodiment, and FIG. 4 is an exploded perspective view illustrating the shaft 100 and a slip terminal assembly 200 of the slip ring device 10 for a motor according to an embodiment. FIG. 5A is a diagram illustrating the slip terminal assembly 200 of the slip ring device 10 for a motor according to an embodiment, and FIG. 5B is a diagram illustrating a first slip terminal portion 210 and a second slip terminal portion 220 of the slip ring device 10 for a motor according to an embodiment. FIG. 6 is a diagram illustrating a fixing ring 300 of the slip ring device 10 for a motor according to an embodiment.

A slip ring device for a motor includes a slip terminal that connects a slip ring to a field coil, and performs a function of transmitting external power to the field coil of the motor.

In the related art slip ring device for a motor, in order to protect and secure the slip terminal forming the connection from centrifugal force of the motor, the slip terminal is located on an inner diameter of a shaft and insert injection-molded. However, in order to realize the above configuration, the shaft requires an opening penetrating through the inside and outside of the shaft, and in this case, oil leakage may occur in the corresponding region due to shrinkage of an injection molded product.

The present disclosure relates to an improved slip ring device for a motor in which inner/outer diameters of a shaft are not penetrated and a slip terminal assembly is located on an outer surface of the shaft to prevent oil leakage.

Referring to FIGS. 1 to 6, the slip ring device 10 for a motor according to an embodiment may include the shaft 100, the slip terminal assembly 200, and the fixing ring 300.

In this specification, for convenience of description, an axial direction of the shaft 100 is set to the y-axis. However, this is only for describing the relative arrangement of each component, and does not limit an installation direction and location of the slip ring device 10 for a motor.

The shaft 100 is connected to a rotor shaft (not shown) of the motor and may perform a function of fixing the slip ring device 10 for a motor to the motor. However, the present disclosure is not limited thereto and the shaft 100 may be used as a rotor shaft (not shown).

The shaft 100 may have a hollow 150 formed therein and may perform an oil pass function to supply oil to the motor. The slip terminal assembly 200 and the fixing ring 300, which are described below, may be disposed on the outer surface of the shaft 100.

As an embodiment, as shown in FIG. 3, the shaft 100 may include a motor connection portion 110 connected to a motor and a coupling portion 120 extending from the motor connection portion 110 and into which a body portion 230 of the slip terminal assembly 200 is inserted.

The motor connection portion 110 may be forcibly press-fitted into the rotor shaft (not shown), which is a counterpart, to serve as a fixing member and maintain concentricity and perpendicularity during assembly. The slip terminal assembly 200 and the fixing ring 300, which are described below, may be arranged in the coupling portion 120. In detail, as shown in FIG. 2, the slip ring device 10 for a motor may have substantially the same diameter in the axial direction (y-axis) or may be formed to have a diameter deviation within a preset range in a state in which the slip terminal assembly 200 and the fixing ring 300 are arranged in the coupling portion 120. To this end, a diameter D6 of the coupling portion 120 may be less than a diameter D2 of the motor connection portion 110.

As an embodiment, the coupling portion 120 may include a first coupling portion 121 adjacent to the motor connecting portion 110 and a second coupling portion 123 extending from the first coupling portion 121. The slip terminal assembly 200 may be coupled to the first coupling portion 121 and the second coupling portion 123, and the fixing ring 300 may be located to overlap a portion of the slip terminal assembly 200 in the first coupling portion 121. Here, a diameter D5 of the second coupling portion 123 may be less than the diameter D6 of the first coupling portion 121, and through this, the slip ring device 10 for a motor may have substantially the same diameter in the axial direction (y-axis) or may be formed within a substantially same diameter range.

As an embodiment, the shaft 100 may further include a support portion 130 located between the motor connection portion 110 and the coupling portion 120 and supporting the fixing ring 300 in the axial direction. The support portion 130 may divide a region between the motor connection portion 110 and the coupling portion 120 and may also support the slip terminal assembly 200.

The support portion 130 may have a structure that protrudes from the outer surface of the shaft 100 in a radial direction. In detail, a diameter D1 of the support portion 130 may be greater than the diameter D2 of the motor connection portion 110. The support portion 130 may include a first support portion 131 and a second support portion 132 having different diameters to form a step structure. Here, the diameter D1 of the support portion 130 refers to the diameter D1 of the first support portion 131 having a greater diameter.

The first support portion 131 may support one end of the slip terminal assembly 200 inserted into the shaft 100, and the second support portion 132 may support the fixing ring 300 inserted into the shaft 100. A diameter D7 of the second support portion 132 may be less than the diameter D1 of the first support portion 131, so that one end of each of a first leg portion 232 and a second leg portion 233 of the slip terminal assembly 200 may be exposed externally.

In addition, the diameter D7 of the second support portion 132 may correspond to a diameter of the fixing ring 300. Through this, the slip ring device 10 for a motor according to the present disclosure may minimize the formation of a step in the connection portion between the shaft 100 and the fixing ring 300.

Meanwhile, the shaft 100 according to an embodiment may further include a guide portion 140 formed on an outer surface of the coupling portion 120 in an insertion direction of the slip terminal assembly 200.

The guide portion 140 may function to guide the insertion direction when the slip terminal assembly 200 is inserted into the shaft 100 and function to limit movement of the slip terminal assembly 200 in a circumferential direction of the shaft 100. As an embodiment, the guide portion 140 may be formed in a groove shape with a preset depth h1 in a radial center direction from the outer surface of the coupling portion 120. Here, the depth h1 of the guide portion 140 may be a depth from the outer surface of the first coupling portion 121 in the radial center direction.

As another embodiment, the guide portion 140 may be formed to extend to the support portion 130 in the axial direction. The guide portion 140 may have a structure that extends to a partial region of the first support portion 131 through the second support portion 132.

Two or more guide portions 140 may be provided in the shaft 100, and in an embodiment, a pair of guide portions 140 may be formed symmetrically.

Meanwhile, referring to FIG. 2, a hollow 150 may be formed inside the shaft 100. A first hollow portion 151 may be formed in a position corresponding to the motor connection portion 110, and a second hollow portion 152 may be formed in a position corresponding to the coupling portion 120. Here, the first hollow portion 151 may communicate with the second hollow portion 152. An inner diameter D3 of the first hollow portion 151 may be greater than an inner diameter D4 of the second hollow portion 152.

The shaft 100 according to an embodiment may form an oil path when oil circulates through the hollow 150 formed therein and may not have a separate opening penetrating through the inner/outer diameter in addition to the hollow 150, thereby securing rigidity and eliminating the risk of oil leakage. In addition, the shaft 100 may have the hollow 150 to have a constant diameter, thereby further improving oil flow efficiency.

Hereinafter, the slip terminal assembly 200 is described with reference to FIGS. 2, 4, 5A, and 5B.

The slip terminal assembly 200 may include a first slip terminal portion 210, a second slip terminal portion 220, and a body portion 230.

The first slip terminal portion 210 may include a first slip ring 211 and a first slip terminal 212, and the second slip terminal portion 220 may include a second slip ring 221 and a second slip terminal 222. The first slip terminal portion 210 and the second slip terminal portion 220 function to electrically connect a brush holder (not shown) and a motor (not shown) to provide externally applied power to the motor. The first slip ring 211 and the second slip ring 221 may be arranged coaxially and apart from each other.

The first slip ring 211 and the second slip ring 221 may include a conductive material and form a contact point with the brush holder (not shown) to transmit power or signals.

One end of the first slip terminal 212 may be connected to an inner circumferential surface of the first slip ring 211, and another end of the first slip terminal 212 may be exposed to the outside of the body portion 230. Similarly, the second slip terminal 222 may be connected to an inner circumferential surface of the second slip ring 221 and may be formed to be exposed to the outside of the body portion 230. The first slip terminal 212 and the second slip terminal 222 may be apart from each other and may be arranged symmetrically with respect to the shaft 100.

Through the structure in which the first slip terminal 212 and the second slip terminal 222 are arranged on the outer diameter of the shaft 100, an angle at which the first slip terminal 212 and the second slip terminal 222 are bent may be gentler than that of the structure of the related art in which the first slip terminal 212 and the second slip terminal 222 are inserted into the shaft 100. Through this, the present disclosure may realize the effect of saving materials.

The body portion 230 fixes the overall shape of the slip terminal assembly 200 and serves to electrically insulate the first slip terminal portion 210 and the second slip terminal portion 220 from each other. The body portion 230 may include a head portion 231, a first leg portion 232, and a second leg portion 233.

The first slip ring 211 and the second slip ring 221 may be arranged to be apart from each other on the head portion 231. As an embodiment, the head portion 231 may include a spacer 2311 that separates the first slip ring 211 and the second slip ring 221 at a preset distance. Here, one or more irregularities may be formed in a strip shape on an outer circumferential surface of the spacer 2311.

The first leg portion 232 may extend from the head portion 231 and may surround and fix the first slip terminal 212. The second leg portion 233 may extend from the head portion 231 and may surround and fix the second slip terminal 222.

In an embodiment, one end of each of the first leg portion 232 and the second leg portion 233 may be connected to the inside of the head portion 231 and extend to the outside of the head portion 231, and another end thereof may be bent in a direction away from the outer surface of the shaft 100. Another ends of the first leg portion 232 and the second leg portion 233 may guide so that the other ends of the first slip terminal 212 and the second slip terminal 222 are exposed to the outside, respectively, through the structure described above.

Meanwhile, referring to FIG. 4, in an embodiment, the first leg portion 232 and the second leg portion 233 may have a thickness h2 corresponding to the depth h1 of the groove of the guide portion 140 and may have a width w2 corresponding to a width w1 of the groove of the guide portion 140.

That is, when the slip terminal assembly 200 is coupled to the shaft 100, the groove of the guide portion 140 may correspond to the size and shape of the first leg portion 232 and the second leg portion 233, and thus, separation, when coupled, may be reduced. In addition, the fixing ring 300, which is described below, may be coupled on the assembly, without a large step.

Hereinafter, the fixing ring 300 is described in detail with reference to FIG. 6.

Referring to FIG. 6, the fixing ring 300 serves to fix the slip terminal assembly 200 on the shaft 100 through forced press-fitting. The fixing ring 300 may include a first region 310 adjacent to the support portion 130 and a second region 320 extending from the first region 310. Here, an outer diameter D9 of the first region may be greater than an outer diameter D8 of the second region.

In an embodiment, the fixing ring 300 may include steel. The fixing ring 300 may be coupled to the shaft 100 by a forced press-fitting method, such as press or shrink-fit. Thereafter, a bearing and an oil seal may be located and assembled on the fixing ring 300.

Referring back to FIG. 2, in the slip ring device 10 for a motor according to an embodiment, the slip terminal assembly 200 may be assembled on the coupling portion 120 of the shaft 100 through the above structure and the fixing ring 300 may be assembled on the outer surface of the slip terminal assembly 200. In detail, the first slip terminal 212 and the second slip terminal 222 may be surrounded by the body portion 230 and may be connected to the inner circumferential surfaces of the first slip ring 211 and the second slip ring 221, respectively, and the other ends thereof may be bent in a direction away from the outer surface of the shaft from a region adjacent to the support portion 130.

As described above, in the slip ring device 10 for a motor according to an embodiment, because the slip terminal assembly 200 is assembled to and formed on an outer portion of the shaft 100, the inner diameter/outer diameter of the shaft 100 are not penetrated and an injection molded product may be located on the outer diameter of the shaft 100. Accordingly, the slip ring device 10 for a motor according to an embodiment may prevent oil leakage, thereby solving the problems of the related art slip ring device for a motor.

Hereinafter, a manufacturing method of the slip ring device 10 for a motor according to the present disclosure is described.

Figure 7A:
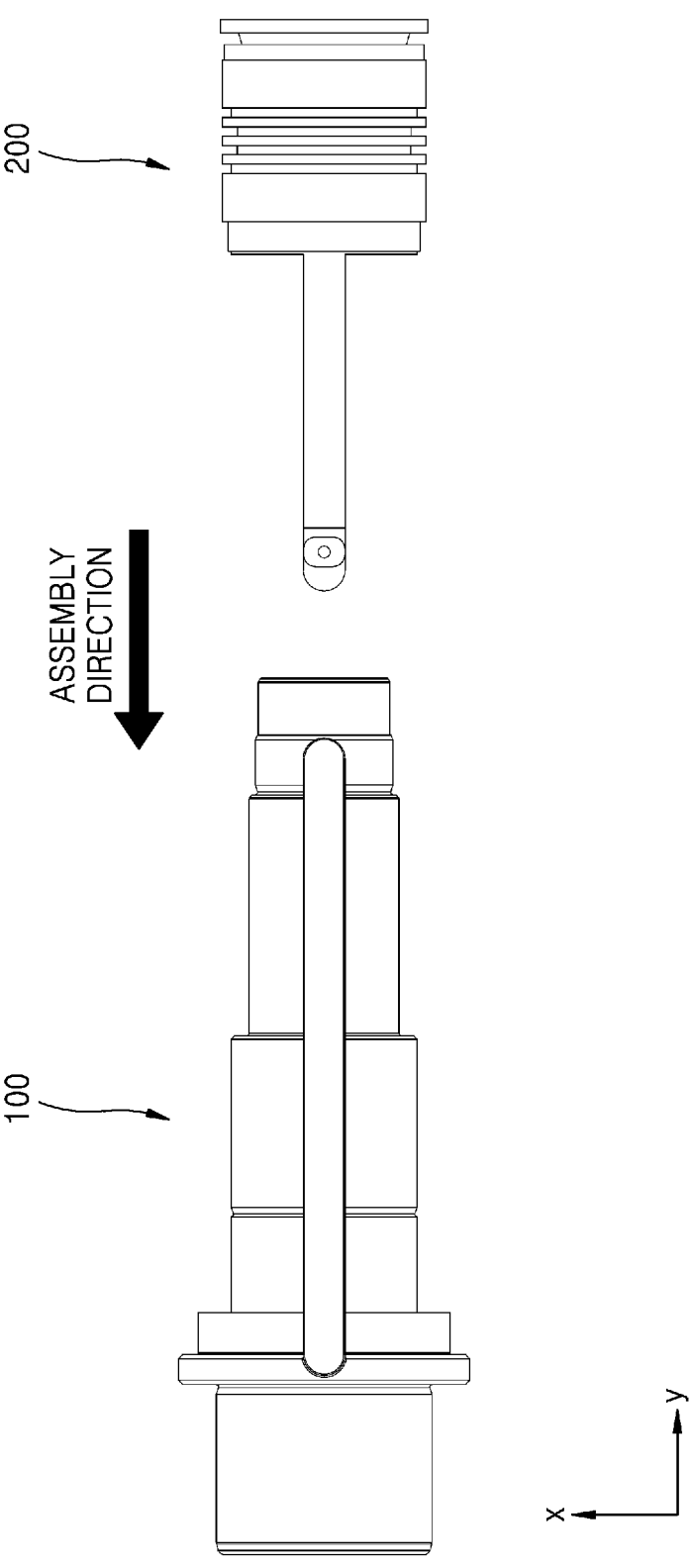
FIGS. 7A to 7C illustrate a sequential process of assembling a slip ring device for a motor according to an embodiment.
Figure 7B:
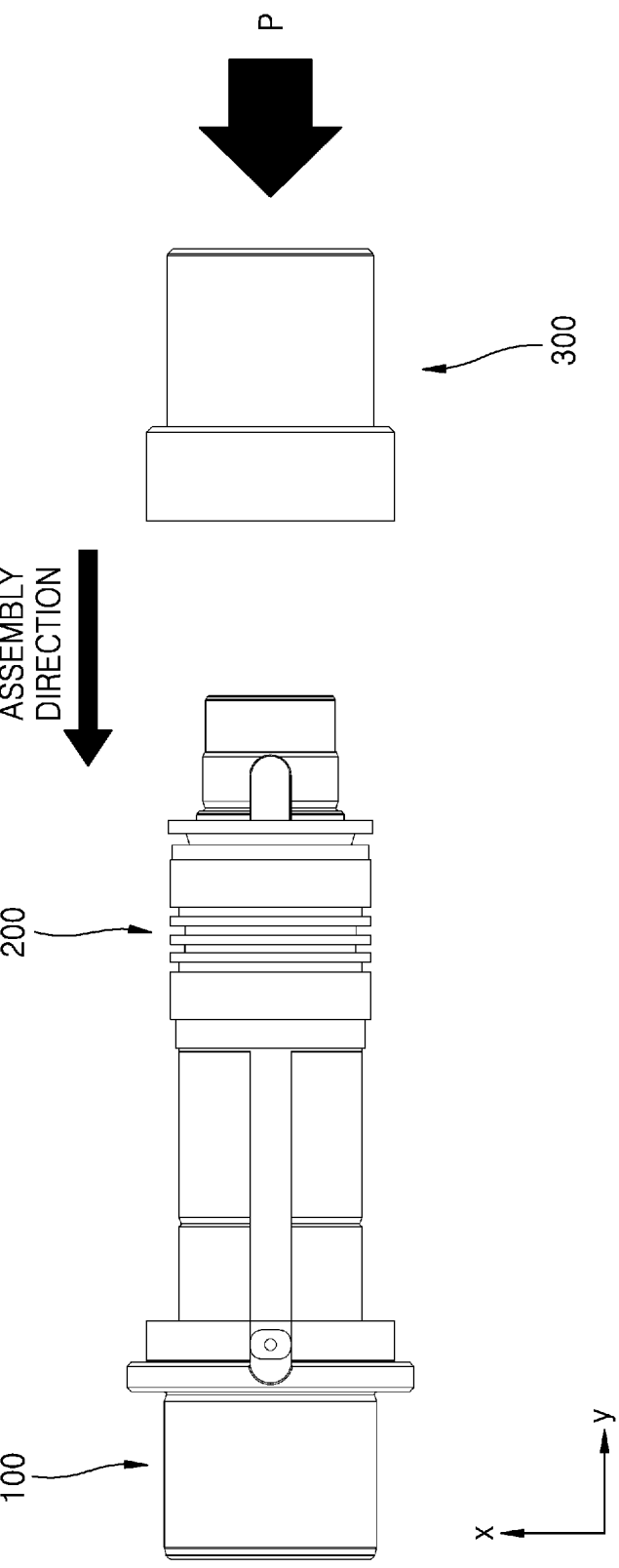
Figure 7C:
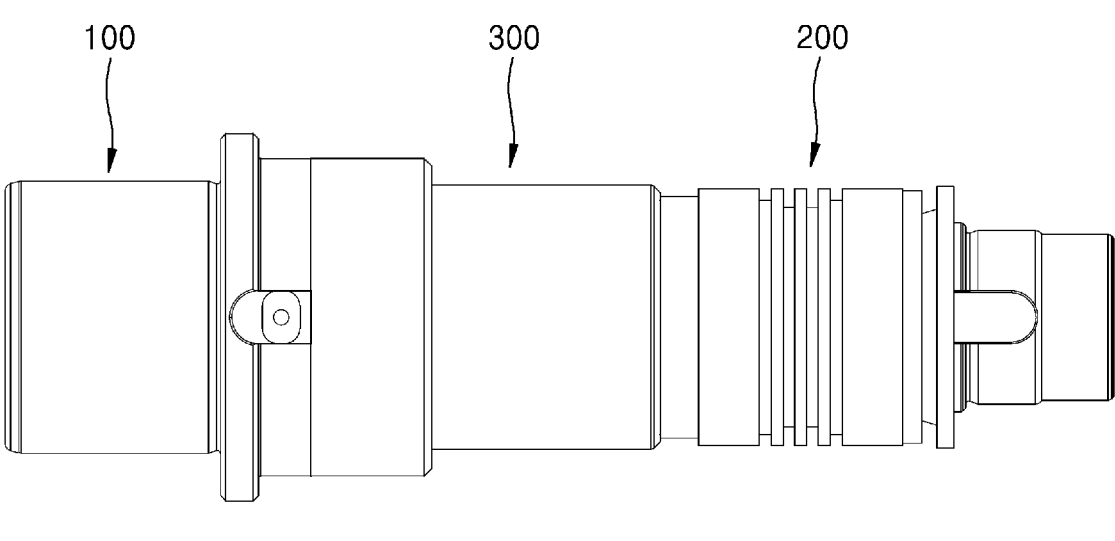
Figure 7C:
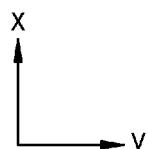

FIGS. 7A to 7C illustrate a sequential process of assembling a slip ring device for a motor according to an embodiment.

The related art slip ring device for a motor used a method of assembling the slip terminal portion to pass through a shaft inner diameter portion and then injection-molding a coupled slip terminal portion from a mold.

Referring to FIGS. 7A to 7C, in the slip ring device 10 for a motor according to an embodiment, the slip terminal assembly 200 is moved linearly along the guide portion 140 of the shaft 100 to be assembled, and thereafter, the fixing ring 300 is press-fitted into the outer diameter portion of the shaft 100 to fix and couple the slip terminal assembly 200 to the shaft 100. The slip ring device 10 for a motor according to an embodiment may eliminate a shaft inner and outer diameter passing portion through the structure and process described above, thereby preventing oil leakage, and may eliminate deformation factors and reduce process costs by eliminating the need for an injection molding process. In addition, the slip ring device 10 for a motor according to an embodiment may reduce product costs compared to the injection molding method through the press-fitting method of the fixing ring.

As such, the present disclosure has been described with reference to an embodiment shown in the drawings, but this is merely an example, and those skilled in the art will understand that various modifications and variations of the embodiment may be therefrom. Therefore, the true scope of technical protection of the present disclosure should be determined by the technical spirit of the attached patent claims.

The slip ring device for a motor according to embodiments is based on a method of assembling by inserting the slip terminal assembly into a guide machined portion on the outer diameter of the shaft, rather than having a structure in which the slip terminal penetrates through the inner/outer diameter of the shaft, and thus, there is no need to form an opening on the inner/outer diameter of the shaft, thereby eliminating a risk factor of oil leakage.

In addition, the slip ring device for a motor according to embodiments is manufactured by simply inserting and assembling the slip terminal assembly into the shaft, thereby reducing the number of assembly steps, increasing production efficiency, and reducing production costs.

In addition, in the slip ring device for a motor according to embodiments, the slip ring is fixed along with the press-fitting of the fixing ring after assembly, without injection molding, and thus, additional injection molding cost may be saved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A slip ring device for a motor, the slip ring device comprising:
a shaft having a hollow inside forming an oil path and being a closed-type structure without a separate opening penetrating from the hollow inside to an outer surface of the shaft;
a slip terminal assembly including a first slip terminal portion and a second slip terminal portion and a body portion coupled to the shaft and electrically isolating the first slip terminal portion from the second slip terminal portion;
the body portion including a leg portion surrounding at least a portion of the first slip terminal portion or the second slip terminal portion; and
a fixing ring disposed to overlap at least a portion of the leg portion to fix the slip terminal assembly to the shaft.

2. The slip ring device of claim 1, wherein the first slip terminal portion and the second slip terminal portion are formed on an outer portion of the shaft.

3. The slip ring device of claim 1, wherein the first slip terminal portion includes:
a first slip ring including a conductive material; and
a first slip terminal having one end connected to an inner circumferential surface of the first slip ring and another end exposed to the outside of the body portion, and the second slip terminal portion includes:

a second slip ring located coaxially with the first slip ring and apart from the first slip ring; and
a second slip terminal located to be apart from the first slip terminal and having one end connected to an inner circumferential surface of the second slip ring and another end exposed to the outside of the body portion.

4. The slip ring device of claim 3, wherein the body portion of the slip terminal assembly includes:
a head portion allowing the first slip ring and the second slip ring to be apart from each other, a first leg portion extending from the head portion and surrounding and securing the first slip terminal, and a second leg portion extending from the head portion and surrounding and securing the second slip terminal.

5. The slip ring device of claim 4, wherein the head portion includes
a spacer separating the first slip ring from the second slip ring at a preset distance, and
one or more irregularities are formed in a strip shape on an outer circumferential surface of the spacer.

6. The slip ring device of claim 4, wherein one end of each of the first leg portion and the second leg portion is connected to the inside of the head portion and extends to the outside of the head portion, and another end of each of the first leg portion and the second leg portion is bent in a direction away from an outer surface of the shaft.

7. The slip ring device of claim 4, wherein the shaft includes
a guide portion formed in a groove shape with a preset depth from an outer surface of the shaft in an insertion direction of the slip terminal assembly, and
the first leg portion and the second leg portion of the body portion are formed to have a thickness corresponding to a depth of the guide portion.

8. The slip ring device of claim 1, wherein the shaft includes:
a motor connection portion connected to the motor; and
a coupling portion which extends from the motor connection portion and into which the body portion of the slip terminal assembly is inserted, and
a diameter of the motor connection portion is greater than a diameter of the coupling portion.

9. The slip ring device of claim 8, wherein the shaft further includes
a guide portion formed on an outer surface of the coupling portion in an insertion direction of the slip terminal assembly.

10. The slip ring device of claim 9, wherein the shaft further includes
a support portion located between the motor connection portion and the coupling portion and supporting the fixing ring in an axial direction, and
a diameter of the support portion is greater than a diameter of the motor connection portion.

11. The slip ring device of claim 10, wherein the hollow includes
a first hollow portion formed in a position corresponding to the coupling portion, and
an inner diameter of the first hollow portion is constant in the axial direction.

12. The slip ring device of claim 11, wherein the hollow further includes
a second hollow portion formed in a position corresponding to the motor connection portion, and
an inner diameter of the second hollow portion is greater than the inner diameter of the first hollow portion.

13. The slip ring device of claim 9, wherein
the guide portion is
formed in a groove shape with a preset depth in a radial
   center direction from the outer surface of the coupling
   portion.

14. The slip ring device of claim 8, wherein
the fixing ring fixes the slip terminal assembly as the
   fixing ring is forcibly press-fitted with the slip terminal
   assembly located on the shaft.

15. The slip ring device of claim 14, wherein
the fixing ring is located on the coupling portion of the
   shaft and includes a first region adjacent to the motor
   connection portion and a second region extending from
   the first region, and
an outer diameter of the first region is greater than an
   outer diameter of the second region.

16. A slip ring device for a motor, the slip ring device
comprising:
   a shaft having a hollow formed inside forming an oil path
      and a guide portion formed on an outer surface of the shaft, wherein the shaft is a closed-type structure with-
      out a separate opening penetrating from the hollow
      inside to the outer surface;
a slip terminal assembly formed outside the shaft and
   including a slip terminal and a leg portion surrounding
   at least a portion of the slip terminal; and
a fixing ring disposed to overlap at least a portion of the
   leg portion of the slip terminal assembly,
wherein one side of the slip terminal is formed inside the
   slip terminal assembly, and another side of the slip
   terminal is exposed to the outside of the slip terminal
   assembly.

17. The slip ring device of claim 16, wherein
the slip terminal assembly includes:
a slip ring in contact with one side of the slip terminal.

18. The slip ring device of claim 17, wherein
the leg portion is formed to correspond to a shape of the
   guide portion.

* * * * *